United States Patent [19]

Sternberger

[11] Patent Number: 4,819,894

[45] Date of Patent: Apr. 11, 1989

[54] RETRACTING DEVICE

[75] Inventor: Joe E. Sternberger, Wichita, Kans.

[73] Assignee: The Boeing Company, Seattle, Wash.

[21] Appl. No.: 103,595

[22] Filed: Oct. 2, 1987

[51] Int. Cl.$^4$ .............................................. B64D 1/02
[52] U.S. Cl. .............................. 244/137.4; 242/107.5;
242/107.6; 242/107
[58] Field of Search ....................... 244/137.4, 138 R;
242/107.5, 107.12, 107.4 R, 107.6, 107.7

[56] References Cited

U.S. PATENT DOCUMENTS

2,966,674  12/1960  Clark ................................ 244/138 R
3,007,653  11/1961  Becker ............................. 242/107.5

Primary Examiner—Galen Barefoot
Assistant Examiner—Rodney Corl
Attorney, Agent, or Firm—Finnegan, Henderson, Farabow, Garrett & Dunner

[57] ABSTRACT

A device for retracting a separable component of an object on separation of the object from a launcher, the device comprising a housing attached to the launcher, a power spring in the housing for the component on separation of the object from the launcher, a shaft connected to one end of the power spring for winding the power spring during loading of the object on the launcher, a lock for automatically fixing the power spring in a predetermined wound position, an annular flange structure connected to the shaft for automatically preventing over winding of the power spring, and a cam device responsive to separation of the object from the launcher for releasing the lock.

12 Claims, 7 Drawing Sheets

RETRACTING DEVICE

The U.S. government has a paid-up license in this invention and the right in limited circumstances to require the patent owner to license others on reasonable terms as provided for by the terms of Contract No. F33657-83-C-0533 awarded by the Department of Defense.

BACKGROUND OF THE INVENTION

1. Field of the Invention

The invention relates to a retracting device, and more particularly, to a device for retracting a separable component of an object on separation of the object from a launcher.

2. Description of Related Art

In airborne carrying and launching of an air breathing projectile, such as a cruise missile, it is necessary to provide a cover for the air inlet of the projectile to restrict contamination of the engine. Such an inlet cover, however, must be removed prior to igniting the engine. Where such projectiles are carried by the aircraft on external pylons, internal racks, or rotary launchers which are not accessible to the crew, an automatic means for removing inlet covers must be provided. One such means would be to attach the inlet cover to the aircraft such that release of the projectile pulls the inlet cover from the engine inlet. A plurality of inlet covers hanging from lanyards attached to the aircraft present a hazard to the aircraft not only due to damage caused by airflow banging the inlet covers against the aircraft, but also due to possible separation of the inlet covers from the lanyard and ingestion of the inlet covers by the aircraft engines.

The same problem arises where any object carried by an aircraft for airdrop contains a separable component which must be removed prior to use of the object. For example, many of the modern bombs and chemically propelled missiles include guidance systems requiring clear nose cones. Covers protecting the nose cones from damage and dirt would have to be removed when the bombs or missiles are launched. The same problems associated with removal of an inlet cover from an air breathing missile apply to removal of any separable component from an object launched from an aircraft.

Hill Aviation Logistics of Chatsworth, Calif., provides a Rectractable Missile Cover Retainer Assembly, Part No. 102D101-2, which functions to remove inlet covers on launch of a missile. This device, however, has certain disadvantages, particularly with respect to the complex steps required to arm the device during loading of the missile. The Hill device, for example, requires manual operation of several separate controls to wind and arm the device and requires use of a torque wrench to prevent over-winding of the power spring. In addition, these complex steps must be performed on the device in a relatively inaccessible location during loading of the missile.

The subject invention provides a device which removes a separable component from an object on separation of the object from a launcher and retracts that component to a position where damage to the carrying aircraft is minimized.

The invention also provides means for simple, convenient operation while ensuring the safety of ground personnel during loading of the object and attachment of the component to the device and includes means for arming the device after loading of the object on its launcher.

The objects and advantages of the invention may be realized and obtained by means of the instrumentalities and combinations particularly pointed out in the appended claims.

SUMMARY OF THE INVENTION

In accordance with the invention, as embodied and broadly described herein, a device for retracting a separable component of an object on separation of the object from a launcher comprises a housing attached to the launcher, power spring means in the housing for retracting the component, the power spring means being adapted for connection to the component, means for winding the power spring means, lock means for automatically fixing the power spring means in a predetermined wound position, means responsive to operation of the winding means for automatically preventing over winding of the power spring means, and means responsive to separation of the object from the launcher for releasing the lock means.

Preferably the power spring means comprises a helical spring disposed around a shaft rotatably supported by the housing, one end of the spring being fixed to the shaft and the other end of the spring being connected to the housing, and spool means drivingly connected to the shaft for rotation therewith and being adapted to engage a lanyard connected to the object.

The winding means preferably comprises means for rotating the shaft in a winding direction and means for restricting rotation of the shaft in an unwinding direction during loading of the object.

In a preferred embodiment, the lock means comprises a cam roller pivotally attached to the housing, an annular disk attached to the shaft for rotation therewith, the disk having a first slot disposed in the periphery thereof to receive the cam roller for blocking rotation of the shaft in the unwinding direction, and timing means for obstructing movement of the cam roller into the first slot until the shaft has rotated the predetermined number of rotations.

Preferably the releasing means comprises means for permitting limited rotation of the spool means in the winding direction independant of the shaft in response to separation of the object from the launcher and cam means responsive to the limited rotation of the spool means for forcing the cam roller out of engagement with the first slot.

BRIEF DESCRIPTION OF THE DRAWINGS

The accompanying drawings, which are incorporated in and constitute a part of the specification, illustrate one embodiment of the invention, and together with the description, serve to explain the principles of the invention.

DETAILED DESCRIPTION OF THE PREFERRED EMBODIMENT

Reference will now be made in detail to the present preferred embodiment of the invention, an example of which is illustrated in the accompanying drawings.

Figure 1:
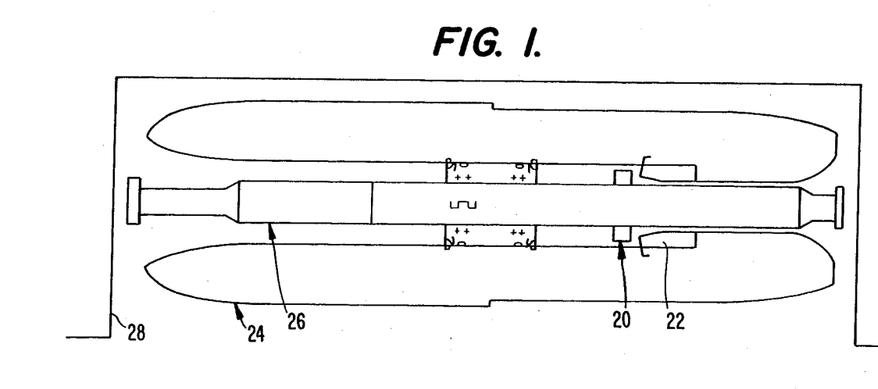
FIG. 1 is a side view of cruise missiles mounted on a rotary launcher presenting the environment of use an embodiment of the invention.
Figure 2:
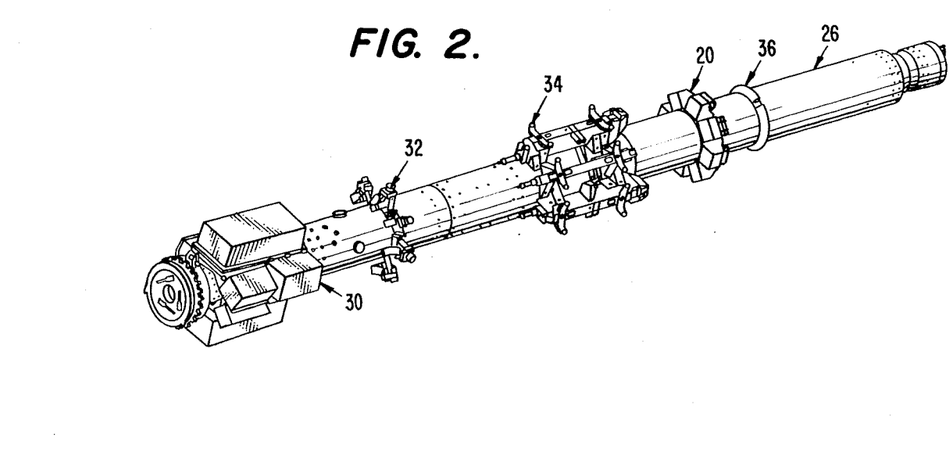
FIG. 2 is a perspective view of the rotary launcher of FIG. 1.

The invention is directed to a device for retracting a separable component from an object on separation of the object from a launcher. In the present preferred embodiment, as seen in FIG. 1, the device of the invention, generally designated 20 in FIG. 1, is used for retracting the cover (a separable component) of the engine air inlet 22 from an air launched cruise missile 24 (an object) during launch or separation from a common strategic rotary launcher 26 carried in the bay 28 of a B-1B aircraft. As seen in FIG. 2, common strategic rotary launcher 26 includes appropriate avionics 30, electrical umbilicals 32 for connection to the missile, missile suspension systems 34, missile engine inlet bumper 36 and retraction devices 20. The launcher is adapted to carry eight missiles and includes one retraction device for each missile.

In accordance with the invention, the device comprises a housing attached to the launcher. As embodied herein and depcited in FIGS. 4-6, the device of the invention includes housing 60 attached to launcher 26.

Figure 4:
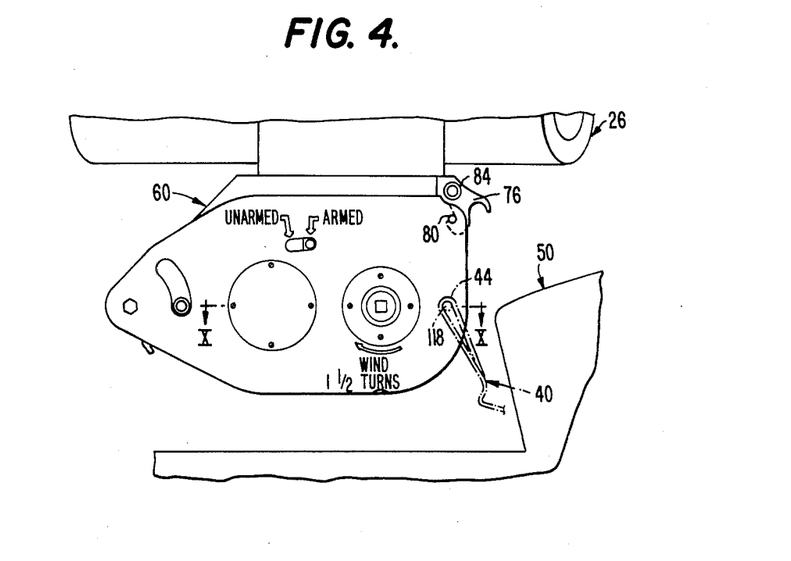
FIG. 4 is a side view of the retraction device of the invention.
Figure 5:
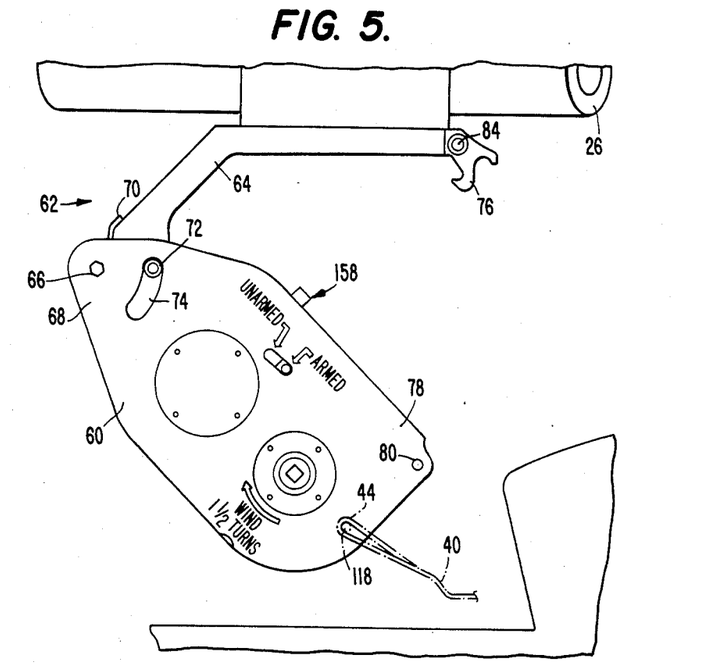
FIG. 5 is a side view of the retraction device of the invention in position during loading of the missile.
Figure 6:
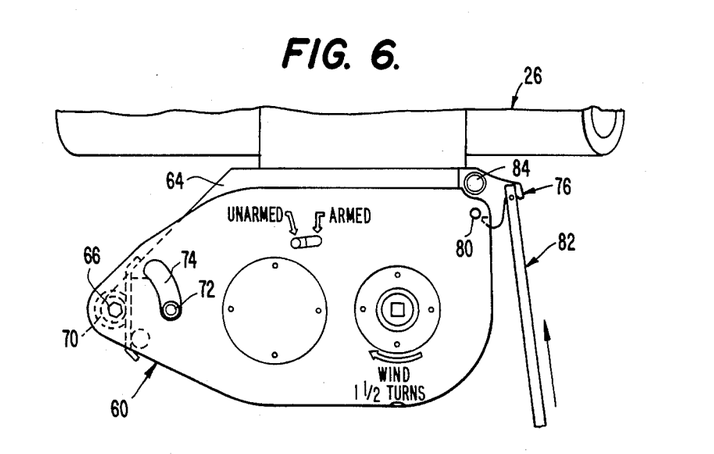
FIG. 6 is a side view of the retraction device of the invention depicting means for moving the retraction device from the loaded to loading positions.
Figure 9:
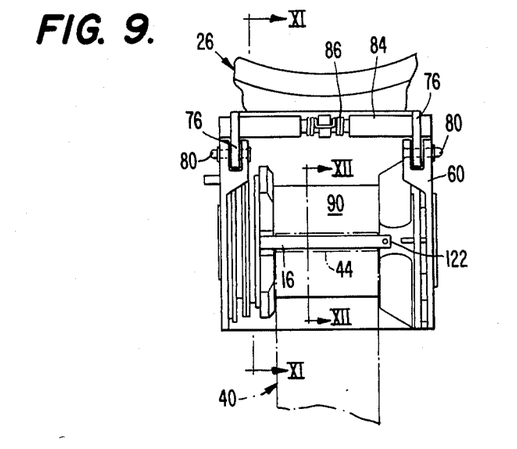
FIG. 9 is an end view of the retraction device of the invention as seen from the right side of FIG. 4.

Preferably, the device includes means for selectively moving housing 60 between a loading position, depicted in FIG. 5, pivotally separated from launcher 26 and a loaded position, depicted in FIG. 4, operably fixed to launcher 26. The moving means preferably comprises a bolt structure 62 including bracket 64 fixed to launcher 26, pivot bolt 66 pivotally attaching one end 68 of housing 60 to bracket 64, hinge spring 70 (FIGS. 6 and 11) providing a biasing force between housing 60 and bracket 64, and slide bolt 72 fixed to bracket 64 and received in slot 74 in housing 60 to limit movement of housing 60 about pivot bolt 66. The moving means preferably further includes a latch structure 76 releasably attaching the other end 78 of housing 60 to launcher 26. As seen in FIGS. 4-6 and 11, latch 76 is pivotally attached to bracket 64 and selectively engages pin 80 to retain housing 60 in the loaded position. Latch 76 may be released by manually moving the latch using a tool 82 to disengage pin 80. As seen in FIG. 9, the latch structure preferably includes two latches 76 interconnected by rod 84 and including spring 86 for biasing latches 76 into engagement with pins 80.

In accordance with the invention, the device includes power spring means in the housing for retracting the component on separation of the object from the launcher, the power spring means being adapted for connection to the component.

Figure 10:
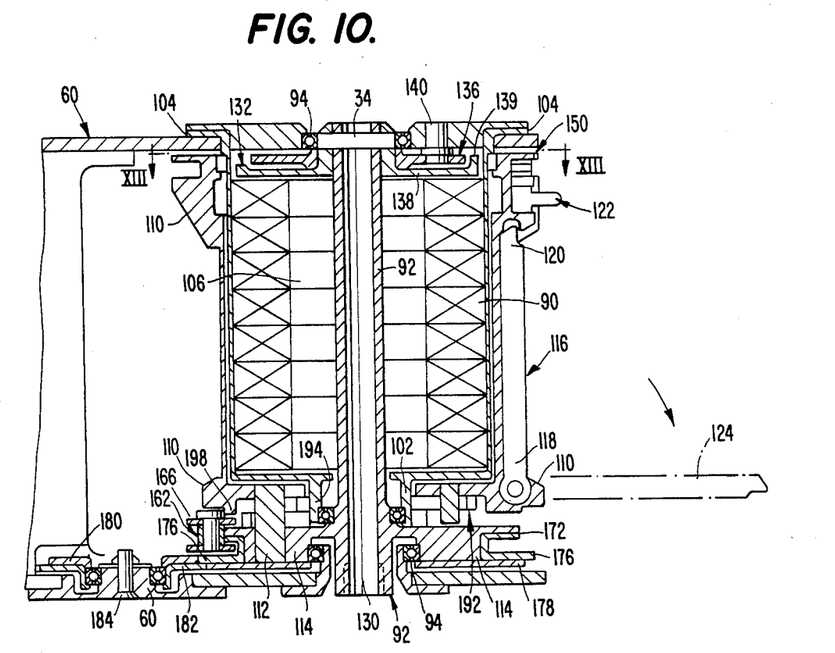
FIG. 10 is a cross-sectional view of the retraction device of the invention taken along lines X—X in FIG. 4.
Figure 12:
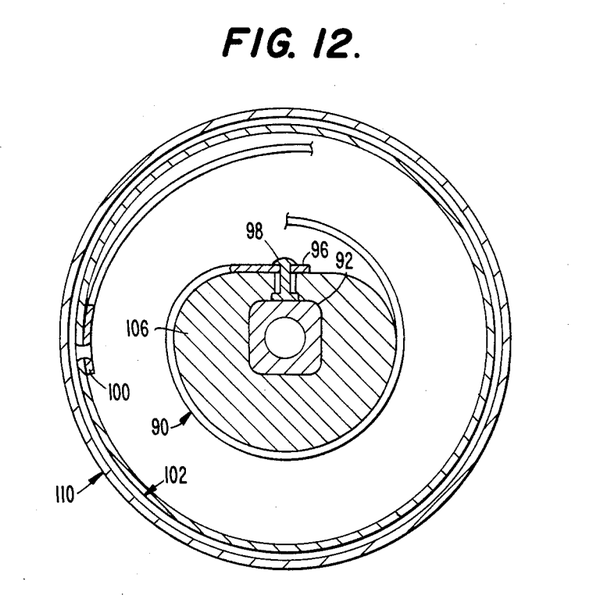
FIG. 12 is a cross-sectional view of the power spring means of the retraction device of the invention taken along lines XII—XII in FIG. 9.

Preferably, as embodied herein and depicted in FIGS. 9, 10, and 12, the power spring means comprises a helical spring 90 disposed around shaft 92 which is rotatably supported by housing 60 through bearings 94. One end 96 of spring 90 is fixed to shaft 92 by means of a rivet or bolt 98 and the other end 100 of spring 90 is connected to housing 60. The end 100 of spring 90 is connected to housing 60 by being attached to spring case 102 which is rigidly secured at one end 104 to housing 60. Preferably, shaft 92 is surrounded by spacer 106 about which the first portion of spring 90 is wound. As seen in FIGS. 10 and 12, spring case 102 is generally cylindrical and coaxial with shaft 92. Shaft 92 rotates with respect to spring case 102.

The power spring means of the invention further preferably includes a spool means drivingly connected to shaft 92 for rotation therewith and for engaging a lanyard 40 connected to the component. As depicted in FIG. 10, the spool means includes spool 110 which coaxially surrounds spring case 102 and is spaced therefrom to permit rotation around spring case 102. Spool 110 is connected by pin 112 to annular disk 114 integral with shaft 92. Rotation of shaft 92 causes spool 110 to rotate about spring case 102. Spool 110 includes lanyard pull pin 116 having one end 118 pivotally attached to spool 110 and the other end 120 releasably fixed to spool 110. Pull pin 116 is disposed to receive and fixedly engage lanyard 40. Pull pin 116 can be pivotally moved about its one end 118 by releasing the other end 120 through activation of release pin structure 122. In its open position 124 lanyard pull pin 116 is disposed to receive second end 44 of lanyard 40. In its closed position, lanyard pull pin 116 fixedly engages the second end of lanyard 40.

Figure 3:
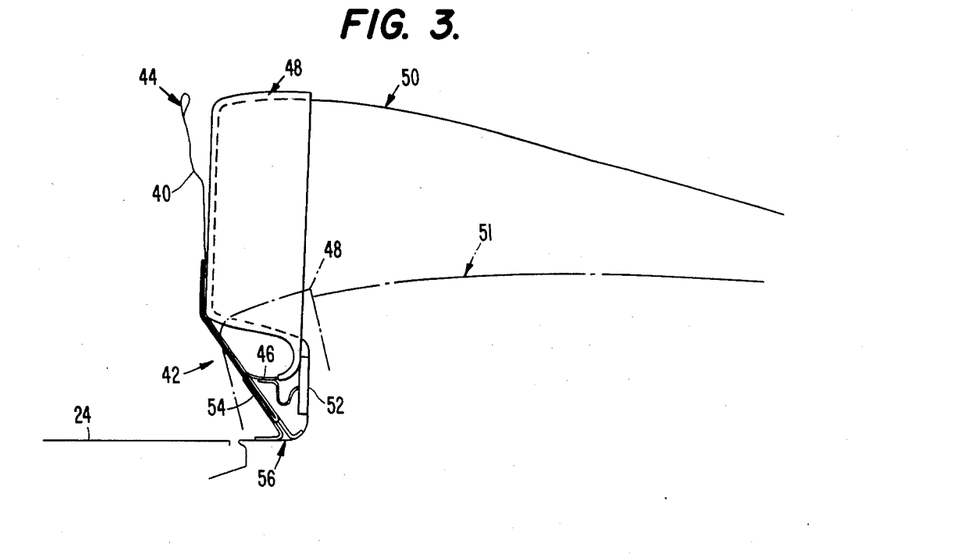
FIG. 3 is a side view of the air inlet portion of a cruise missile showing the lanyard and fixing means of the invention.

Preferrably, as depicted in FIG. 3, lanyard 40 has a first end 42 and second end 44. First end 42 includes first portion 46 fixed to cover 48 for missile engine inlet 50 and to ram air inlet plug 52, which are separable components. First end 42 of lanyard 40 also includes a second portion 54 which is fixed to missile 24 by means of a metal D-ring 56. Metal D-ring 56 is attached to missile 24 by, for example, use of a spring-loaded detent having a predetermined strength such that when missile 24 is separated from launcher 26 it imposes a tensile force on lanyard 40, the second end 44 of which is attached to spool 110 as explained above, causing release of the spring detent securing D-ring 56 to missile 24. On separation of D-ring 56 from missile 24, lanyard 40 through first portion 46 of first end 42 removes inlet cover 48 and ram air inlet plug 52. The spring detent, or other means of attaching second portion 54 to missile 24, is carefully selected to separate from missile 24 after launch in response to a first predetermined tensile force imposed on lanyard 40 due to launch of missile 24.

Although not necessary for the invention, in the embodiment depicted, missile 24 includes air inlet 50 which is movable from a stowed position depicted at 51 in FIG. 3 to an extended position as seen in solid lines in FIG. 3. In this embodiment, the tensile force imposed on lanyard 40 by separation of missile 24 from launcher 26 serves to raise air inlet 50 from its stowed position to its extended position. Accordingly, the first predetermined tensile force selected for separation of D-ring 56 from missile 24, in this embodiment, must be sufficient to first raise air inlet 50 to its extended position before separation of first end 42 from missile 24. In addition, the means for fixing first portion 46 of first end 42 to air inlet 48 and ram air plug 52 must be strong enough to pull the air inlet and plug from the missile during launch without separation of the lanyard 40 from the separable components.

Figure 11:
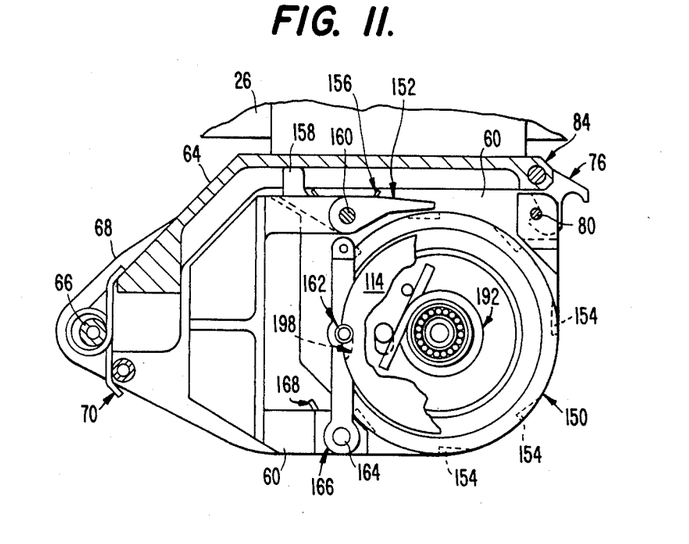
FIG. 11 is a partial cross-sectional view of the retraction device of the invention taken along lines XI—XI in FIG. 9.
Figure 13:
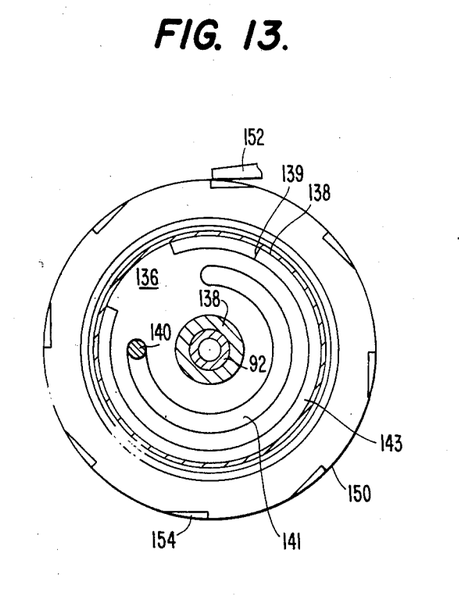
FIG. 13 is a cross-sectional view of the device of the invention taken along line XIII—XIII in FIG. 10.

Preferably the winding means in the preferred embodiment includeds means for restricting rotation of shaft 92 in an unwinding or counter-clockwise direction during loading of the object such as a missile. As seen in FIGS. 10, 11 and 13, the restricting means includes ratchet wheel 150 integrally formed and annularly projecting from one end of spool 110. A pawl 152 is pivotally secured to housing 60 proximate the periphery of ratchet wheel 150. A plurality of notch means 154 are circumferentially spaced about the periphery of ratchet wheel 150 for sequentially receiving pawl 152 to prevent rotation of ratchet wheel 150 in an unwinding or counter-clockwise direction. Since ratchet wheel 150 is attached to spool 110 which is drivingly connected through pin 112 to shaft 92, engagement of pawl 152 in one of notch means 154 prevents counter-clockwise rotation of shaft 92. Notch means 154 is so designed to permit free rotation of ratchet wheel 150 and, therefore, of shaft 92, in the clockwise or winding direction.

The restricting means permits incremental winding of power spring 90 and prevents unintentional unwinding of this power spring while maintenance personnel have a wrench attached to shaft 92 for winding. Pawl 152 is baised by spring 156 into engagement with notch means 154. The restricting means further includes means responsive to the movement of housing 60 into the loaded position for preventing pawl 152 from engaging notch means 154. As seen in FIGS. 5 and 11, when housing 60 is in the loading position, lever 158, which is connected to pawl 152, is free to rotate about pivot 160 permitting pawl 152 to engage notch means 154. When housing 60 is moved to the loaded position, lever 158 engages bracket 64 forcing pawl 152 out of engagement of notch means 154 in opposition to the bias of spring 156. Thus, while the safety device restricting unwinding rotation of shaft 92 is effective while housing 60 is disposed in the loading position, the restricting means is disabled when the housing means is placed in the loaded position.

In accordance with the invention, the device comprises means for winding the power spring means during loading of the object on the launcher. As embodied herein and depicted in FIGS. 10 and 11, the winding means comprises a socket 130 in one end of shaft 92 to drivingly receive a wrench or similar tool for rotating shaft 92 in a winding direction, which in this case is as seen in FIG. 4, is clockwise. Winding shaft 92 in a clockwise direction winds spring 90 generating a biasing force between spring case 102 and shaft 92 tending to rotate shaft 92 in an unwinding or counter-clockwise direction.

In accordance with the invention, the device includes means in the housing responsive to operation of the winding means for automatically preventing over winding of the power spring means.

In the preferred embodiment, the preventing means comprises an annular flange structure, generally 132 in FIG. 10, connected to shaft 92 by pin 134 for rotation with shaft 92. Annular flange structure 132 includes mechanical stop wheels 136 and 138, stop wheel 138 being fixed to shaft 92 and stop wheel 136 being disposed for rotation about the hub of wheel 138. The limiting means further includes stop pin 140 fixed to housing 60 and disposed to engage stop wheel 136. Stop wheel 136 includes annular groove 141 (FIG. 13) slidably receiving the distal end of pin 140 to permit rotation of stop wheel 136 for a predetermined annular distance or number of rotations. Stop wheel 138 includes a finger projecting into the plane of rotation of stop wheel 136. Peripheral slot 143 in stop wheel 136 permits relative motion between stop wheels 136 and 138 for a predetermined annular distance or number of rotations. By selecting the annular length of groove 141 and slot 143, rotation of shaft 92 may be automatically limited to a predetermined number of revolutions, in this case 1½ revolutions.

Figure 7A:
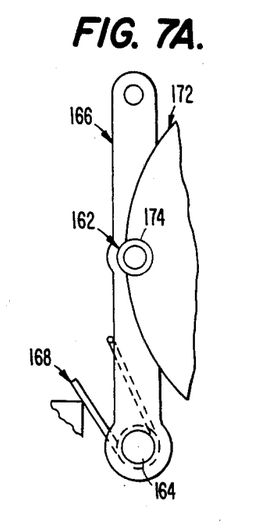
FIG. 7A is a side view of the lock means of the invention in the locked position.
Figure 7B:
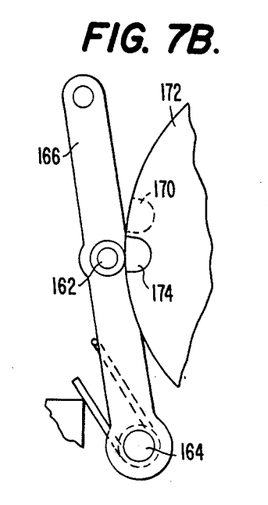
FIG. 7B is a side view of the lock means of the invention in the unlocked position.

In accordance with the invention, the device comprises lock means for automatically fixing the power spring means in a predetermined wound position. In the preferred embodiment as depicted in FIGS. 7A, 7B, 10 and 11, the lock means comprises a cam roller 162 pivotally attached to housing 60. As seen in FIGS. 7A and 7B, bolt 164 pivotally connects lock arm 166 to housing 60 and cam roller 162 is rotatably secured to lock arm 166. Spring 168 biases lock arm 166 for engagement in a first slot 170 disposed in the periphery of annular disk 114 attached to shaft 92 for rotation therewith. Placement of cam roller 162 into first slot 170 in annular disk 114 blocks rotation of shaft 92 in an unwinding direction.

Since, in the preferred embodiment, it is necessary to rotate shaft 92 one and one-half turns, the lock means also includes a timing means for obstructing movement of cam roller 162 into first slot 170 until shaft 92 has rotated a predetermined number of rotations. The timing means comprises a timing wheel 172 disposed axially adjacent the periphery of annular disk 114 for coaxial rotation independent of annular disk 114. Timing wheel 172 includes second slot 174 in the periphery thereof for receiving cam roller 162 when in registration with first slot 170 in the periphery of annular disk 114. The timing means further includes timing gear means drivingly interconnecting timing wheel 172 and shaft 92 for timing rotation of timing wheel 172 to place second slot 174 in registration with first slot 170 when shaft 92 is rotated the predetermined number of rotations. A timing gear means comprises a first timing gear 176 fixed to timing wheel 172 for rotation therewith, a second timing gear 178 fixed to annular disk 114 and, therefore, to shaft 92 for rotation therewith, and first and second idler gears 180, 182 supported by housing 60 for rotation. As seen in FIG. 10, idler gears 180, 182 are fixed by pin 184 to housing 60. First and second idler gears 180, 182 are fixed to each other for rotation together and are disposed to mesh with first and second timing gears 176, 178, respectively. the diameter of timing gears 176 and 178 are selected to achieve registration of first and second slots 170, 174 on completion of the predetermined number of rotations of shaft 92.

In operation, the second timing gear 178 rotates with rotation of shaft 92. Rotation of second timing gear 178 rotates second idler gear 182 which in turn rotates first idler gear 180 which is meshed with and rotates first timing gear 176. Rotation of first timing gear 176 rotates timing wheel 172.

Because of the different diameters of timing gears 176, 178, timing wheel 172 rotates at a different rate than shaft 92 and annular disk 114. By proper selection of the diameters of timing gears 176, 178, registration of slots 170, 174 can be timed to occur for the first time at completion of the predetermined number of rotations of shaft 92.

In accordance with the invention, the device includes means responive to separation of the object from the launcher for releasing the lock means.

As here embodied and depicted in FIGS. 8A, 8B, 10 and 11, the releasing means comprises means for permitting limited rotation of spool 110 in the winding or clockwise direction independent of shaft 92 in response to a second predetermined tensile force imposed on lanyard 44. With lanyard 44 connected to lanyard pull pin 16, separation of missile 24 from launcher 26 imposes a tensile force on spool 110 tending to rotate spool 110 in a clockwise direction around spring case 102. Spool 110 is connected to shaft 92 through pin 112 engaging annular disk 114. Pin 112 engages spool 110 in slot 190. Spring 192 disposed around neck 194 of spring case 102 has one end 195 engaging pin 112 and the other end 197 engaging pin 196 fixed to spool 110. This spring imposes a predetermined biasing force on pin 112 normally maintaining a rigid connection between spool 110 and annular disk 114. When the second predetermined tensile force is imposed on lanyard pull pin 116, this force overcomes the biasing force of spring 192 permitting spool 110 to rotate independently of shaft 92 in a clockwise or winding direction about 10°.

Figure 8A:
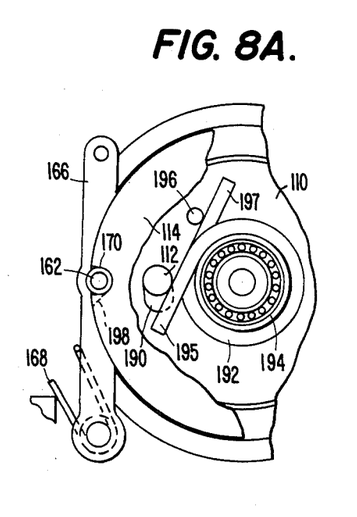
FIG. 8A is a side view of the lock means of the invention in the locked position including a portion of the releasing means of the invention.
Figure 8B:
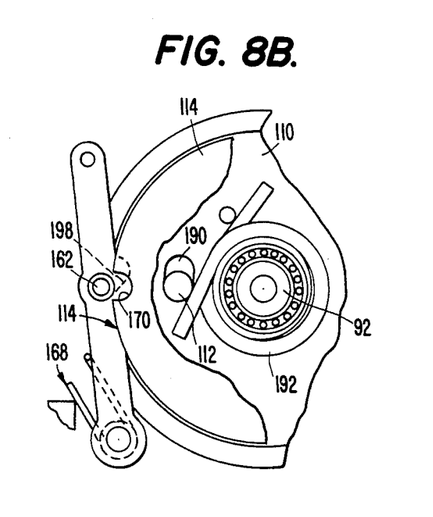
FIG. 8B is a side view of the lock means of the invention after release by the releasing means of the invention.

The releasing means also includes a cam means responsive to the limited rotation of spool 110 for forcing cam roller 162 out of engagement with first and second slots 170, 174. As seen in FIGS. 8A, 8B and 10, spool 110 includes cam 198 which engages cam roller 162 in the locked position as seen in FIG. 8A. Imposition of the second predetermined force on spool 110 overcomes the bias of spring 192 permitting clockwise or winding direction rotation of spring 110 limited by slot 190 causing cam 198 to force cam roller 162 out of registered slots 170, 174. This movement of cam roller 162 releases annular disk 114 and shaft 92 for counter-clockwise rotation caused by the bias generated by wound power spring 90. Such counter-clockwise rotation is imposed on spool 110 through pin 112 thereby rapidly rotating spool 112 in a counter-clockwise direction and retrieving lanyard 40 and attached components such as inlet cover 48 and plug 52.

It will be apparent to those skilled in the art that various modifications and variations could be made in the retracting device of the invention without departing from the scope or spirit of the invention.

What is claimed is:

1. A device for retracting a separable component of an object on separation of the object from a launcher, said device comprising:
    a housing attached to said launcher;
    power spring means in said housing for retracting said component, said power spring means being adapted for connection to said component;
    means in said housing for winding said power spring means;
    lock means in said housing for automatically fixing said power spring means in a predetermined wound position;
    means in said housing responsive to operation of said winding means for automatically preventing over winding of said power spring means; and
    means responsive to separation of said object from said launcher for releasing said lock means.

2. The device of claim 1 wherein said power spring means comprises a helical spring disposed around a shaft rotatably supported by said housing, one end of said spring being fixed to said shaft and the other end of said spring being connected to said housing, and spool means drivingly connected to said shaft for rotation therewith, said spool means being adapted to engage a lanyard connected to said component.

3. The device of claim 2 wherein said winding means comprises means for rotating said shaft in a winding direction, and means for restricting rotation of said shaft in an unwinding direction during loading of said object.

4. The device of claim 3 wherein said rotating means comprises a socket in one end of said shaft for drivingly receiving a wrench means.

5. The device of claim 3 wherein said preventing means comprises an annular flange structure connected to said shaft for rotation therewith, a stop pin fixed to said housing and disposed to engage said flange structure, and means in said flange structure for permitting annular movement thereof with respect to said pin for a predetermined number of rotations of said shaft and for preventing said annular movement on completion of said predetermined number of rotations.

6. The device of claim 3 also including means for selectively moving said housing between a loading position pivotally separated from said launcher and a loaded position operably fixed to said launcher.

7. The device of claim 6 wherein said moving means comprises a bolt structure pivotally attaching one end of said housing to said launcher and a latch structure releasably attaching the other end of said housing to said launcher, release of said latch structure permitting movement of said housing from said loaded position to said loading position.

8. The device of claim 6 wherein said restricting means comprises a ratchet wheel fixed to said spool means for rotation therewith, a pawl pivotally secured to said housing proximate the periphery of said ratchet wheel, a plurality of notch means circumferentially spaced about the periphery of said ratchet wheel for sequentially receiving said pawl to prevent rotation of said ratchet wheel in an unwinding direction, said notch means permitting rotation of said ratchet wheel in the winding direction, spring means for biasing said pawl into engagement with said notch means, and means responsive to movement of said housing into said loaded position for fixedly opposing said spring means to prevent said pawl from engaging said notch means.

9. The device of claim 3 wherein said lock means comprises a cam roller pivotally attached to said housing, an annular disk attached to said shaft for rotation therewith, said disk having a first slot disposed in the periphery thereof to receive said cam roller for blocking rotation of said shaft in the unwinding direction, and timing means for obstructing movement of said cam roller into said first slot until said shaft has rotated said predetermined number of rotations.

10. The device of claim 9 wherein said timing means comprises a timing wheel disposed axially adjacent to the periphery of said annular disk for coaxial rotation independant thereof, said timing wheel having a second slot in the periphery thereof for receiving said cam roller when in registration with said first slot, and timing gear means drivingly interconnecting said timing wheel and said shaft for timing rotation of said timing wheel to place said second slot in resgistration with said first slot when said shaft has rotated said predetermined number of rotations.

11. The device of claim 10 wherein said timing gear means comprises a first timing gear fixed to said timing wheel for rotation therewith, a second timing gear fixed to said shaft for rotation therewith, and first and second idler gears supported by said housing for rotation, said first and second idler gears being fixed to each other for rotation together and being disposed to mesh with said first and second timing gears, respectively, the diameter of said timing gears being selected to achieve registration of said first and second slots on completion of said predetermined number of rotations of said shaft.

12. The device of claim 10 wherein said releasing means comprises means for permitting limited rotation of said spool means in the winding direction independant of said shaft in response to a predetermined tensile force on said lanyard caused by separation of said object from said launcher, and cam means responsive to said limited rotation of said spool means for forcing said cam roller out of engagement with said first and second slots.

* * * * *

UNITED STATES PATENT AND TRADEMARK OFFICE
CERTIFICATE OF CORRECTION

PATENT NO. : 4,819,894
DATED : April 14, 1989
INVENTOR(S) : JOE E. STERNBERGER

It is certified that error appears in the above-identified patent and that said Letters Patent is hereby corrected as shown below:

Column 3, line 51, change "depcited" to --depicted--.

Column 6, line 63, change "the" to -- The --.

Signed and Sealed this

Seventh Day of November, 1989

Attest:

JEFFREY M. SAMUELS

*Attesting Officer*     *Acting Commissioner of Patents and Trademarks*